United States Patent
Osawa et al.

(10) Patent No.: US 8,468,910 B2
(45) Date of Patent: Jun. 25, 2013

(54) FILLER MEMBER FOR CRANKSHAFT

(75) Inventors: Hisato Osawa, Fussa (JP); Takahiro Yamazaki, Akishima (JP); Ken Shirai, Mizuho-machi (JP); Yuji Numakunai, Morioaka (JP)

(73) Assignee: Yamabiko Corporation, Ohme-shi, Tokyo (JP)

( * ) Notice: Subject to any disclaimer, the term of this patent is extended or adjusted under 35 U.S.C. 154(b) by 0 days.

(21) Appl. No.: 13/308,647

(22) Filed: Dec. 1, 2011

(65) Prior Publication Data
US 2012/0137827 A1 Jun. 7, 2012

(30) Foreign Application Priority Data
Dec. 2, 2010 (JP) ................... 2010-269345

(51) Int. Cl.
*F16C 3/12* (2006.01)
*F16C 3/20* (2006.01)

(52) U.S. Cl.
CPC .... *F16C 3/12* (2013.01); *F16C 3/20* (2013.01)
USPC ......... 74/603; 74/595; 123/192.1; 123/192.2; 123/197.4

(58) Field of Classification Search
USPC ............ 74/603, 595; 123/74 R, 197.4, 192.1, 123/192.2; 384/250, 294, 429, 457
IPC ....................................................... F02B 33/04
See application file for complete search history.

(56) References Cited

U.S. PATENT DOCUMENTS

| | | | | |
|---|---|---|---|---|
| 6,044,818 A * | 4/2000 | Decuir | ......... | 123/192.1 |
| 6,062,180 A * | 5/2000 | Carlback | ......... | 123/73 R |
| 6,412,366 B1 * | 7/2002 | Leith | ......... | 74/603 |
| 6,418,902 B1 * | 7/2002 | Ericson | ......... | 123/192.2 |
| 6,526,935 B2 * | 3/2003 | Shaw | ......... | 123/197.4 |
| 6,688,272 B2 * | 2/2004 | Brevick et al. | ......... | 123/192.2 |
| 2003/0221653 A1 * | 12/2003 | Brevick et al. | ......... | 123/192.2 |
| 2004/0035244 A1 * | 2/2004 | Leith et al. | ......... | 74/595 |

FOREIGN PATENT DOCUMENTS

| | | | |
|---|---|---|---|
| DE | 102006030493 A1 * | 1/2008 | |
| JP | 58054214 A * | 3/1983 | |
| JP | 2-026307 A | 1/1990 | |
| JP | 3-272313 A | 12/1991 | |
| JP | 4-203516 A | 7/1992 | |
| JP | 3223515 B2 | 10/2001 | |
| JP | 2004300933 A * | 10/2004 | |
| JP | 2005-076738 A | 3/2005 | |
| JP | 2005-172032 A | 6/2005 | |
| JP | 2007-024155 A | 2/2007 | |
| JP | 4159293 B2 | 10/2008 | |
| JP | 4392224 B2 | 12/2009 | |

* cited by examiner

*Primary Examiner* — Vinh Luong
*Assistant Examiner* — William Santosa
(74) *Attorney, Agent, or Firm* — Merchant & Gould P.C.

(57) ABSTRACT

A filler member to be installed in a crankshaft including a crank web includes: an arm member, extending in a diametrical direction of a crank journal, and a weight member extending in a radial direction of the crank journal. The filler member includes: a fitting member, a connecting member mounted on the bodies. The fitting member is fixed to an outer side face of the crank web. The connecting member is mounted on the bodies to stride the arm member on inner side face of the crank web.

4 Claims, 6 Drawing Sheets

FILLER MEMBER FOR CRANKSHAFT

CROSS REFERENCE TO RELATED APPLICATION

This application claims the foreign priority benefit under Title 35, United States Code, §119(a)-(d) of Japanese Patent Application No. 2010-269345, filed on Dec. 2, 2010 in the Japan Patent Office, the disclosure of which is herein incorporated by reference in its entirety.

BACKGROUND OF THE INVENTION

1. Field of the Invention

The present invention relates to a filler member to be installed in a crankshaft of an engine used for a portable working machine.

2. Description of the Related Art

In a two-stroke engine used in a portable working machine such as a chainsaw, a brush cutter, and a blower, a piston reciprocates in a cylinder by expansion force generated when an air-fuel mixture gas is burned in a combustion chamber after the air-fuel mixture gas in a crank chamber is introduced into the combustion chamber disposed above the cylinder through a scavenging port.

In the crank chamber the crankshaft for converting a reciprocating motion of the piston into a rotary motion is housed. On the crankshaft a crank journal rotating about an axis thereof and a crank web protruding from the crank journal in a diametrical direction of the crank journal are formed.

The crank web includes an arm linearly extending, a weight more extending in both rotational direction of the arm than a width of the arm. A tip of the arm is connected to the piston through a connecting rod to rotate the crankshaft synchronously with the reciprocating motion of the piston.

There is a conventional crankshaft having bodies disposed on both sides of the arm in the rotational direction of the arm to cause the crank web and the bodies to have a disk shape. More specifically, an insertion member on which two bodies are formed is installed in the crank web, and the insertion member is fixed to the crank web by surrounding outer circumferences of the crank web and the both bodies with an annular member (see JP 4392224).

This configuration increases a compression ratio (primary compression ratio) of the air-fuel mixture gas in the crank chamber because a volume of the crank chamber is decreased because the both bodies are installed in the crank chamber. Accordingly, this configuration may provide improvement in increase in an output performance and an acceleration performance, and decrease (emission reduction) in exhausting air contaminants such as HC (hydrocarbon).

In the configuration of the conventional crankshaft in which an annular member surrounds the outer circumferences of the crank web and both the bodies, it was necessary to prevent the annular member from shifting by forming a channel in outer surfaces of the crank web and both the bodies and inserting the annular member into the channel. Therefore, this configuration requires a process of the crank web and a fixing operation of the annular member becomes complicated.

SUMMARY OF THE INVENTION

A first aspect of the present invention provides a filler member to be installed in a crankshaft including a crank web. The filler member includes a web including: an arm member, extending in a diametrical direction of a crank journal, including a connecting rod connection part to be connected to a connection rod; a weight member, disposed opposite to the connecting rod connection part across a rotating center of the crank journal, extending on both sides of the arm member in a radial direction of the crank journal.

According to this configuration, the crank web is sandwiched between the fitting member and the connecting member, so that the filler member can be fixed to the crank web. As described above, the configuration and mounting operation of the filler member are simplified and thus, there is no necessity of processing the crank web to make a channel or a thread hole, so that it is simple to install the filler member in the crank web.

The present invention may provide a filler member for a crankshaft which is easy to be installed in the crank web with bodies disposed on both sides of the crank web in an axial direction of the crank web.

In addition, the connecting member can be disposed near the rotation center of the crank journal. Accordingly centrifugal force acting on the connecting member can be reduced, so that the connecting member can be down-sized and have a simple form.

Particularly, when the connecting member is disposed to stride the rotation center of the crank journal, the centrifugal force acting on the connecting member can be efficiently reduced.

When the crankshaft is rotated, centrifugal forces acting on both the bodies may cause the flat plate to warp on one side of the crank web from the through hole. Both the bodies are connected with the connecting member which strides the arm member on the other side of the crank web, which prevents both the bodies from being deformed.

A material of the fitting member is not specifically limited, but it is preferable to reduce a weight of the filler member and reduce a manufacturing cost by using a plastic material having a small weight ratio and a high moldability.

In the filler member, when each of the bodies includes a locking member protruding from the bodies and the connecting member includes engaging parts engaged with outer circumferences of the locking members on the columns, it is simple to mount the connecting member on both the bodies by pushing the engaging parts onto an outer circumference of the locking members.

When the connecting member has an appropriate flexibility, bending the connecting parts may make it easier to push down the engaging part onto the outer circumference of the locking member.

In addition, if a line between center positions of the engaging parts crosses the rotation center of the crank journal, the connecting member may be disposed to necessarily stride the rotation center of the crank journal when the connecting member is fixed to both the bodies.

In the filler member, when the connecting member is configured with a wire and the engaging parts are formed by bending both ends, the connecting member can be easily formed.

The connecting member may be curved at both ends thereof, which prevents both the bodies and the connecting member itself from being damaged due to contact between edge of the connecting member and the bodies when the connecting member is fixed to both the bodies. This may increase a durability of the filler member. In addition, when the connecting member is formed with a wire member having a circular cross section, this configuration may prevent the connecting member from being damaged due to contact between the connecting member and the bodies. Using the wire member having a circular cross section can reduce a stress concentration of external forces acting on the connecting member.

In the filler member, because the locking member can have a diameter-expanded member at a tip of the locking member having a diameter greater than a diameter of a base of the locking member, the connecting member may be surely fixed to the bodies.

In the filler member according to the present invention, because the configuration and the mounting operation can be simplified and it is not necessary to process the crank web and thus assemble process may be simple, increase in an output performance and an acceleration performance, and reduction in emission can be provided.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

With reference to drawings will be described embodiments of the present invention.

Figure 1:
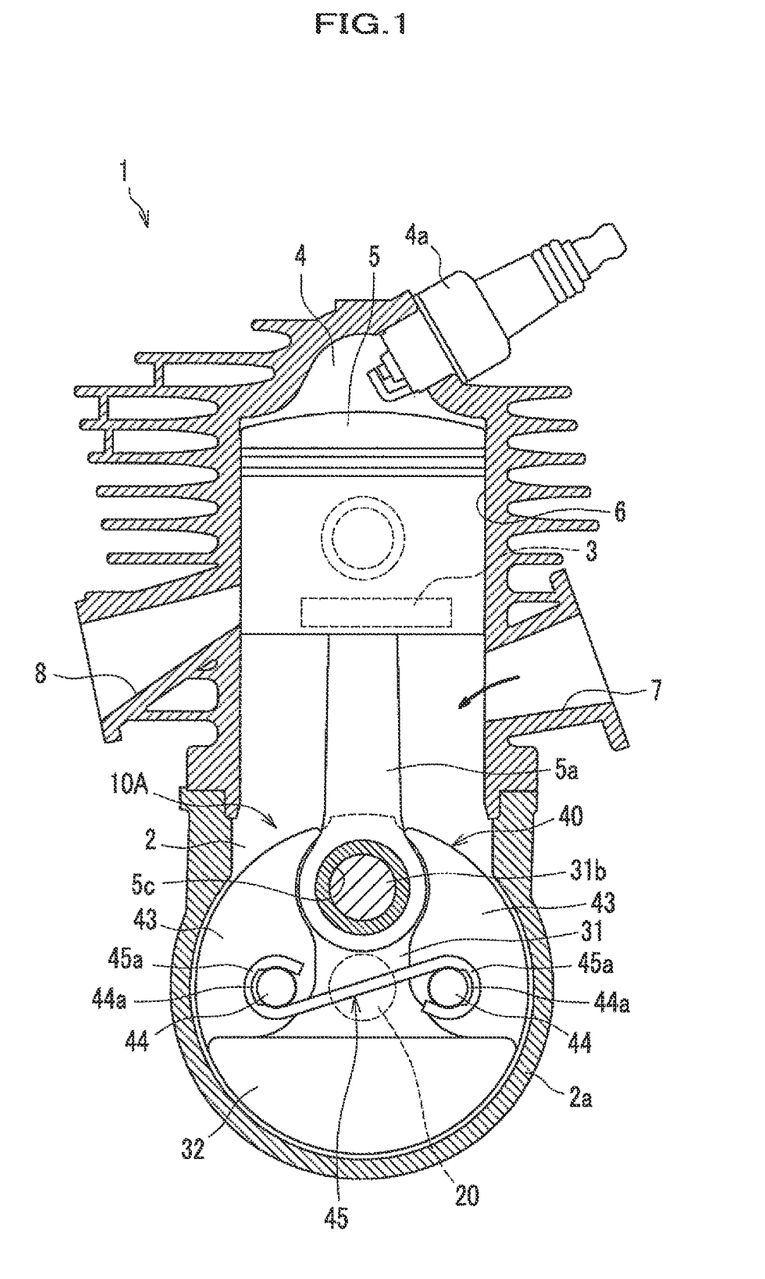
FIG. 1 is a side cross section of an engine for illustrating an intake-and-compression stroke according to a first embodiment of the present invention.

An engine 1 shown in FIG. 1 is a two-stroke engine used for a portable working machine such as a chain saw, a bush cutter, and a blower.

Figure 2:
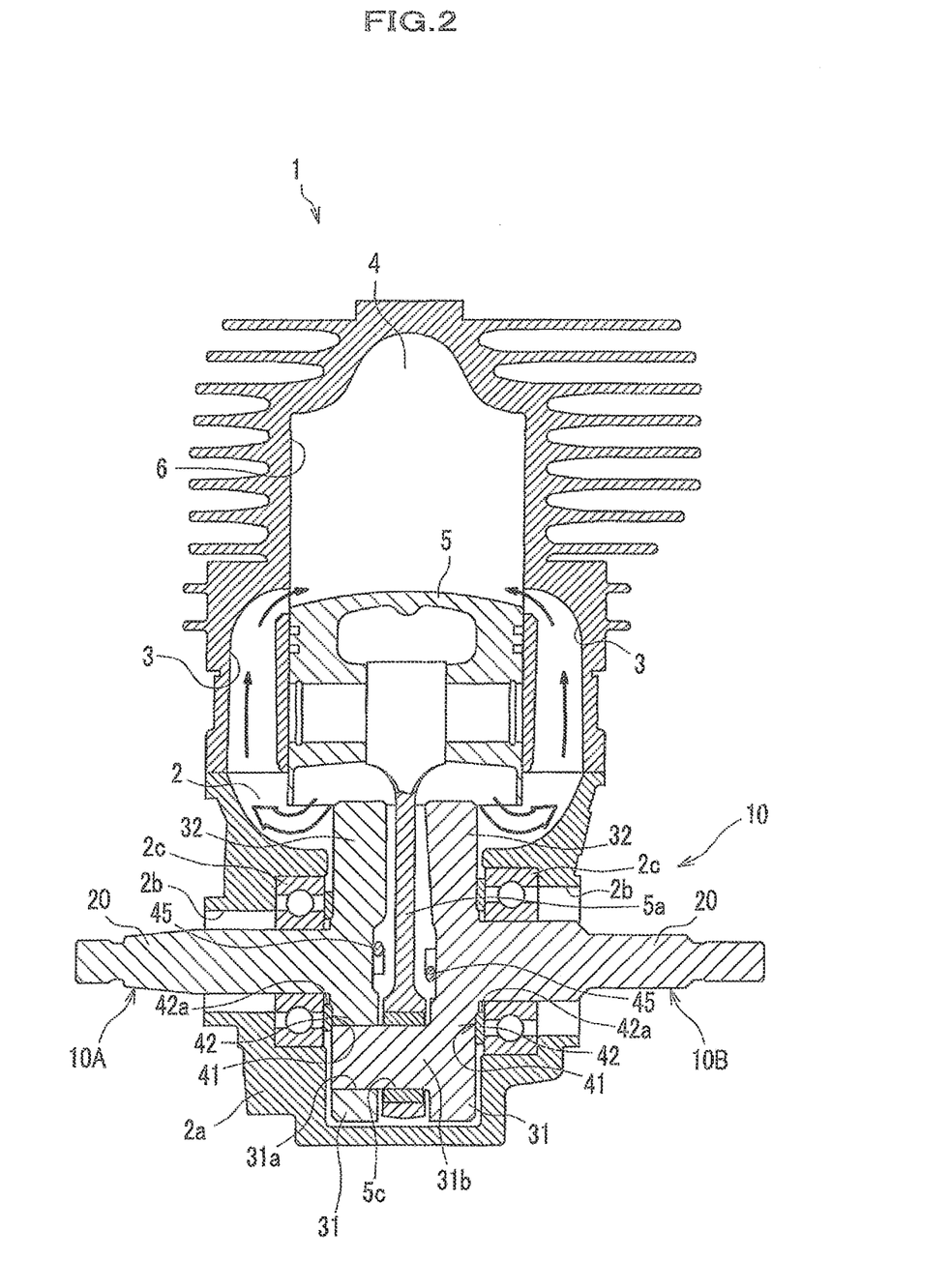
FIG. 2 is a side cross section of the engine, viewed from a side of intake port, for illustrating a scavenging stroke.

The engine 1 mainly includes a piston 5 installed in a cylinder 6 capable of a slidable movement in the cylinder 6, an intake port 7 communicating with the crank chamber 2, an exhaust port 8 communicating with a combustion chamber 4 at an upper part of the cylinder 6, and an scavenging port 3 for communication between the crank chamber 2 and the combustion chamber 4, and a crankshaft assembly 10 including crankshafts 10A, 10B housed in the crank chamber 2 (see FIG. 2).

As shown in FIG. 2, the piston 5 is connected to the crankshafts 10A, 10B through a connecting rod 5a. Reciprocating motions of the piston 5 is converted into rotary motions of the crankshafts 10A, 10B.

As shown in FIG. 1, in the engine 1, when the piston 5 ascends in the cylinder 6, a pressure in the crank chamber 2 becomes negative, so that an air-fuel mixture gas of fuel and air is charged in the crank chamber 2 through the intake port 7.

When the piston 5 reaches a top dead center, the air-fuel mixture gas being introduced into the cylinder 6 in the previous scavenging stroke is compressed in the combustion chamber 4. When the air-fuel mixture gas is ignited by an ignition plug 4a, the piston 5 is pushed down by an expansion force.

When the piston 5 descends, an exhaust port 8 communicates with the combustion chamber 4, so that the combustion gas is exhausted to the exhaust port 8. In addition, as shown in FIG. 2, the pushed down piston 5 compresses the air-fuel mixture gas charged in the crank chamber 2.

When the piston 5 reaches a bottom dead center, the scavenging port 3 becomes in a communication status with the combustion chamber 4. The air-fuel mixture gas in the crank chamber 2 flows into the cylinder 6 through the scavenging port 3.

Further, when reaching the bottom dead center, the piston 5 ascends by rotary motions of the crankshafts 10A, 10B, so that the intake and compression stroke is repeated.

The crankshafts 10A, 10B have, as shown in FIG. 2, a crank journal 20 rotatably supported by a crankcase 2a, so that the crank journal 20 is rotatable on an axis of the crank journal 20.

In the first embodiment, the crankshaft 10A disposed on a left side in FIG. 2 and the crankshaft 10B disposed on a right side in FIG. 2 are integrally assembled and housed in the crank chamber 2.

The crankshafts 10A, 10B disposed on left and right sides in FIG. 2 have substantially symmetrical forms. There is a difference in that on the crankshaft 10B disposed on the right side in FIG. 2 a crank pin 31b is formed, and that on the crankshaft 10A on the left side in FIG. 2 a mounting hole 31a is formed.

Because the crankshafts 10A, 10B have the substantially symmetrical forms, only the crankshaft 10A disposed on the left side in FIG. 2 will be described in detail, and a description of the crankshaft 10B disposed on the right side in FIG. 2 will be omitted.

Figure 3:
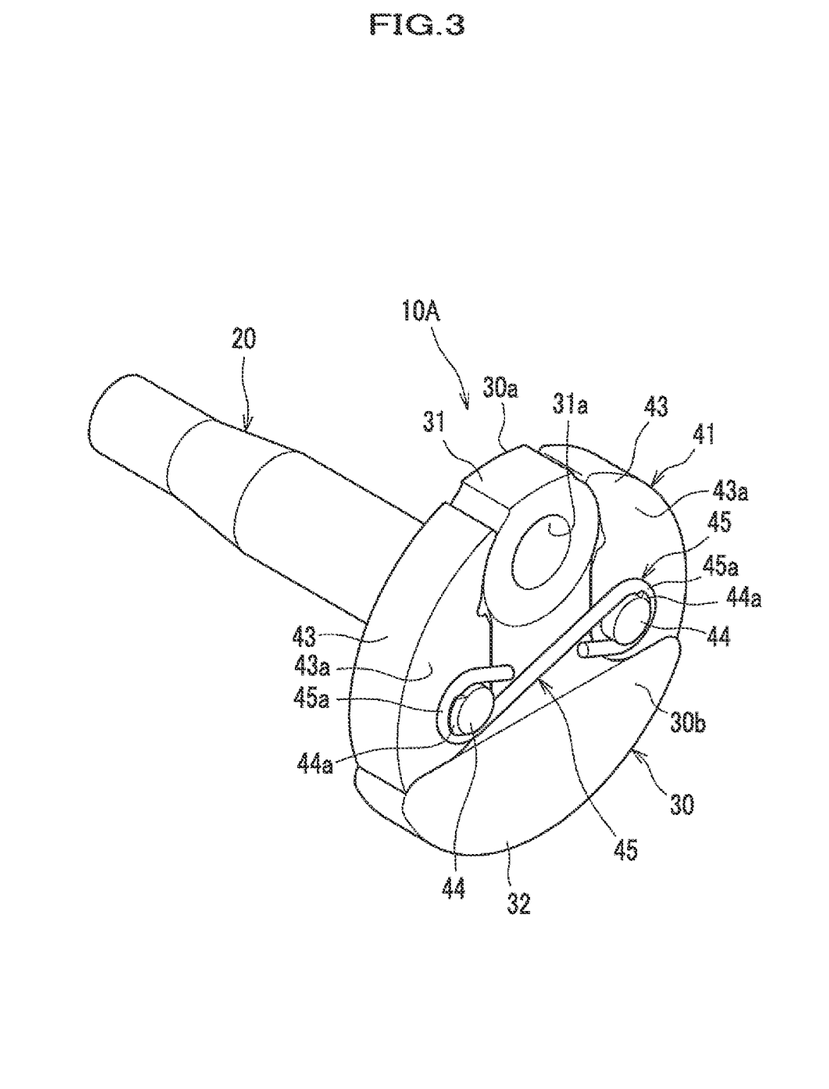
FIG. 3 is a perspective view for illustrating a filler member and a crankshaft according to the first embodiment.

The crankshaft 10A includes, as shown in FIG. 3, a crank journal 20 which is a shaft having a circular cross section and a crank web 30 protruding from the crank journal 20 in a diametric direction of the crank journal 20. The crank journal 20 is formed integrally with the crank web 30 as a metal molded part. In addition, a filler member 40 is installed in the crank web 30 on the crankshaft 10A.

As shown in FIG. 2, the crank journal 20 is inserted into a through hole 2b formed on a side of the crankshafts 10A, 10B, and a tip of the crank journal 20 protrudes from the crankshafts 10A, 10B to an outside of the crankshafts 10A, 10B. In addition, the crank journal 20 is inserted into a hole of a bearing 2c to be rotatably supported on an axis thereof by the crankshafts 10A, 10B.

The crank journal 20 is an output shaft for transmitting a drive force generated by the engine 1 to an outside drive mechanism.

The crank web 30 is, as shown in FIG. 2, a plate member formed at a base part (en end of the crank chamber 2) of the crank journal 20.

Figure 4:
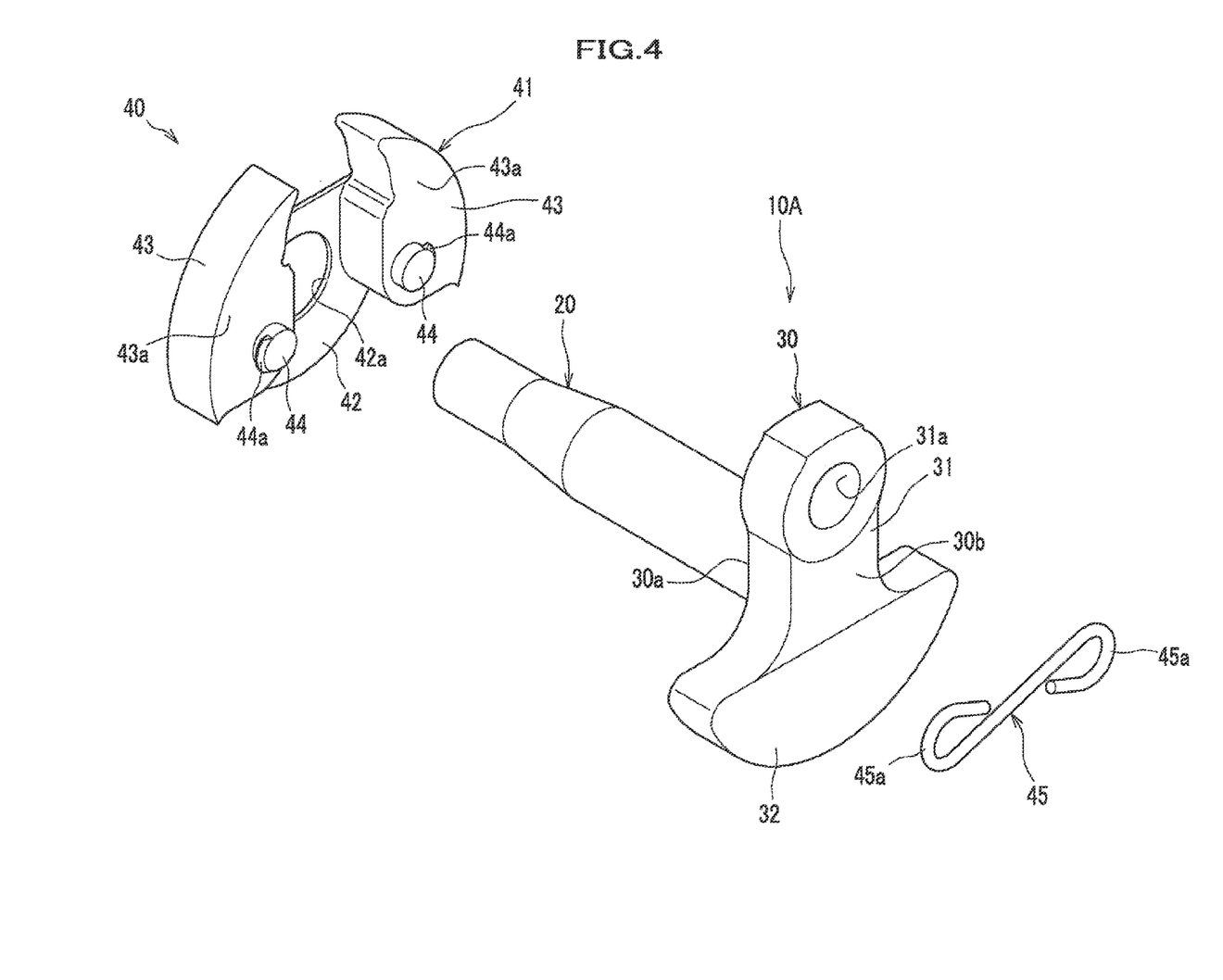
FIG. 4 is an exploded perspective view of the filler member and the crankshaft according to the first embodiment of the present invention.

The crank web 30 includes, as shown in FIG. 4, an arm 31 having a mounting hole 31a, a weight member 32 offset in an opposite direction of the mounting hole 31a across a rotating center of the crank journal 20.

The arm 31 is a linearly formed part extending from the crank journal 20 in a diametric direction of the crank journal 20 (upward and downward directions in FIG. 4), and a part protruding upward from the crank journal 20 in FIG. 4 is formed longer than a part protruding downward from the crank journal 20 (see FIG. 1).

The crankshaft 10A shown on the left side in FIG. 2 has the mounting through hole 31a in a tip of the arm 31 (a lower end shown in FIG. 2). The crankshaft 10B shown in the right side in FIG. 2 has the crank pin 31b at a tip of the arm 31 (lower end in FIG. 2).

The crank pin 31b of the crankshaft 10B on the right side in FIG. 2 is inserted into a through hole 5c formed in a lower end of the connecting rod 5a rotatably, and a tip of the crank pin 31b is inserted into the mounting hole 31a of the crankshaft 10A and fixed to the crankshaft 10A.

As mentioned above, the mounting hole 31a formed in the arm 31 or the crank pin 31b are parts connected to the connecting rod 5a as a connecting rod connection part.

The weight member 32 is, as shown in FIG. 1, formed at a base part (a lower end in FIG. 1) of the arm 31. The weight member 32 extends on both sides of the arm 31 in rotational direction of the arm 31 and has a fan shape having an arc shape at outer edge in a diametrical direction.

Accordingly, the crank web 30 is formed in a T-shaped with the arm 31 linearly extending and the weight member 32 formed at the base part of the arm 31 to have the fan shape.

The filler member 40 includes, as shown in FIG. 4, a fitting member 41 on which two bodies 43, 43 on both sides of a through hole 42a, and a connecting member 45 fixed to both the bodies 43 and 43. The fitting member 41 is fixed to an outer face 30a of the crank web 30 as shown in FIG. 3 by inserting the crank journal 20 into the through hole 42a. In addition, the connecting member 45 is configured to be fixed to both the body 43, 43 on a side of an inner face 30b of the crank web 30.

The fitting member 41 includes a flat plate 42, two bodies 43, 43 disposed on both sides of the flat plate 42 in a width direction of the flat plate 42. The fitting member 41 is a plastic part into which the flat plate 42 and both the bodies 43, 43 are integrally formed. As a material of the fitting member 41, the plastic, having a high moldability, reduces a weight of the fitting member 41 and a manufacturing cost. In addition, the fitting member 41 is formed with a plastic material having a relatively high heat resistance.

The flat plate 42 is a planar part having the circular through hole 42a at a center in the width direction of the flat plate 42. The flat plate 42 is sandwiched between the crank web 30 and a bearing 2c in a state in which the crank journal 20 is inserted into the through hole 42a.

Both the bodies 43, 43 are arranged on both sides of the arm 31 as shown in FIG. 3. Both the bodies 43, 43 are formed, as shown in FIG. 4, on both sides of a width direction of the flat plate 42 and protrude from the flat plate 42 on a side of the crank web 30. In addition, as shown in FIG. 3, a thickness of both the bodies 43, 43 is set so that tip faces 43a, 43a of both the bodies 43, 43 are substantially flush with an inner face 30b of the crank web 30 in height.

In addition, because the bodies 43, 43 are formed with a plastic material having a small specific gravity, the bodies 43, 43 are lighter smaller weight than the weight member 32 of the crank web 30.

As shown in FIG. 1, a region of a side face of the body 43 facing the crank web 30 is formed along shapes of the arm 31 and the weight member 32. In addition, a region of a side face of the body 43 exposed to the inside of the crank chamber 2 is formed in an arc shape (surface) continuous to an arc edge face of the weight member 32.

Accordingly, when both the bodies 43, 43 are arranged on both sides of the arm 31 in a rotation direction of the arm 31, the crank web 30 and both the bodies 43, 43 have a circular plate shape.

Figure 5:
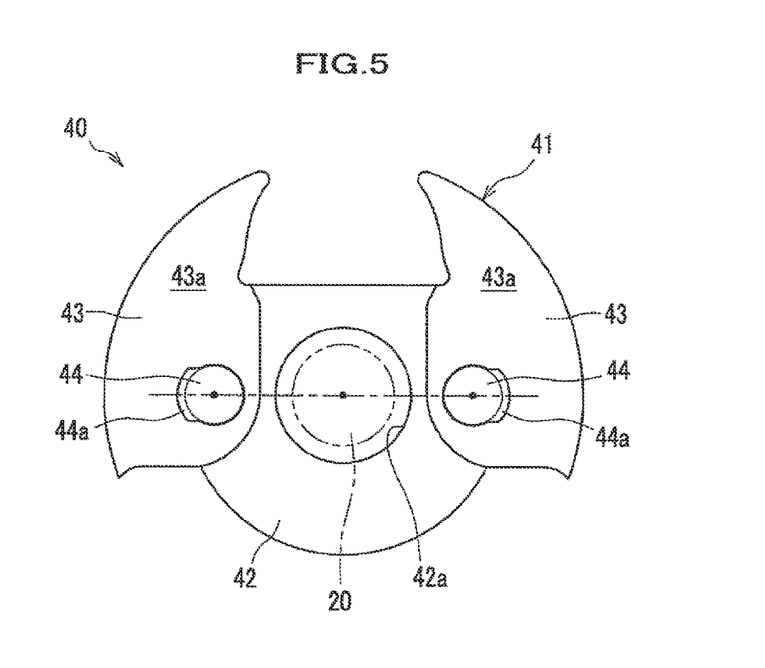
FIG. 5 is a side view of a fitting member according to the embodiment of the present invention.

As shown in FIG. 5, protruded locking members (column) 44 having a circular cross section are formed on tip faces 43a of the bodies 43. The locking members 44 are parts with which engaging parts 45a of the connecting member 45 are to be engaged (see FIG. 3). At a part of an outer circumferential edge of a tip face of the locking member 44 has an enlarged-diameter part 44a protruding in a diametrical direction of the locking member 44 as a claw.

In this embodiment, a line crossing centers of both the locking members 44 crosses a rotation center of the crank journal 20 inserted into the through hole 42a.

The connecting member 45 comprises a steel wire (a wire body) such as a piano wire as shown in FIG. 4. In this embodiment, a steel wire has a circular cross section with respect to an axial direction thereof. The connecting member 45 is formed to have an S-shape having the engaging parts 45a, 45a by bending both ends of the steel wire to have arc shapes curving in opposite directions.

The engaging parts 45a is, as shown in FIG. 3, a part to be engaged by fitting to an outer circumference of the locking member 44 of the body 43 and pushed down. The engaging part 45a is pushed down after riding over the enlarged-diameter part 44a, which provides a stopper for the engaging parts 45a with the enlarged-diameter part 44a.

As described above, the connecting member 45 is fixed to both bodies 43, 43 by fitting the engaging part 45a to the outer circumference of the locking member 44 and pushing down without any tool.

The connecting member 45 has appropriate flexibilities throughout all parts thereof to facilitate to be fitted to the outer circumference of the engaging parts 45a, 45a and pushed down.

The connecting member 45 fixed to both the bodies 43, 43 is arranged as shown in FIG. 1, such that the connecting member 45 strides the arm 31 of the crank web 30. In addition, a middle of the connecting member 45 slantwise strides the rotation center of the crank journal 20 necessarily because a line crossing centers of both the locking members 44 crosses a rotation center of the crank journal 20 (see FIG. 5), when the both ends of the connecting member 45 is fixed to the locking members 44, 44.

As described, sandwiching the crank web 30 between the fitting member 41 and the connecting member 45 provides fixation of the filler member 40 to the crank web 30 and disposes both the bodies 43 on the both sides of the arm 31 in the rotation direction of the arm 31.

When the piston 5 shown in FIG. 2 reciprocates in the cylinder 6, the connecting rod 5a ascends and descends synchronously with the piston 5, so that the connecting rod 5a lifts or pushes down the crank pin 31b to rotate the crankshafts 10A and 10B rotate on an axis of the crank journal 20.

Primary vibrations generated when the piston 5 returns at the top dead center and the bottom dead center are cancelled out with centrifugal forces caused by rotation of the weight members 32, 32.

In the crankshafts 10A and 10B according to this embodiment, both the bodies 43, 43 are made lighter than the weight member 32, which provides such a configuration that a variation in weight balance of the crank web 30 is avoided even in a status in which the filler member 40 is assembled in the crank web 30.

An engine 1 having the crankshafts 10A and 10B to which the filler member 40 is fixed provides an advantageous effect as follows:

As shown in FIG. 1, the filler member 1 according to the first embodiment is configured to have a disk shape by the crank web 30 and both bodies 43, 43. Because the bodies 43, 43 are disposed in the crank chamber 2, a volume of the crank chamber 2 is decreased, so that a primary compression ratio of the air-fuel mixture gas in the crank chamber 2 becomes large. This increases an output performance, an acceleration performance, and a degree of emission reduction.

As shown in FIG. 3, the filler member 40 according to the first embodiment can be fixed to the crank web 30 by that the crank web 30 is sandwiched between the fitting member 41 and the connecting member 45.

As described above, because the configuration of the filler member 40 and a mounting process are simplified, and there is no necessity to process the crank web 30, it is easy to assemble the filler member 40 into an existing crank web 30.

When the crankshaft 10A is rotated, centrifugal forces acting on both the bodies 43, 43 cause the flat plate 42 (see FIG. 4) to warp on a side of the outer face 30a of the crank web 30. In the embodiment, both the bodies 43, 43 are connected to the connecting member 45 which strides the arm 31. This prevents both the bodies 43, 43 from being deformed.

In addition, as shown in FIG. 1, because the connecting member 45 is disposed to stride a rotation center of the crank journal 20, centrifugal forces acting on the connecting member 45 become small.

In the embodiment, the connecting member 45 at a middle part thereof is disposed to stride the rotation center of the crank journal 20 slantwise to the diametrical direction of the crank journal 20. This increases a resistant strength of the connecting member 45 to a centrifugal force.

Therefore, as shown in FIG. 4, the connecting member 45 can be down-sized and has a simple shape, which reduces a manufacturing cost of the connecting member 45.

In addition, the connecting member 45 can be simply mounted on both the bodies 43, 43 by fitting the engaging parts 45a, 45a of the connecting member 45 to the outer circumferences of the locking member 44 on the bodies 43, 43. Because the connecting member 45, having a flexibility, can be deformed throughout respective parts thereof, both the engaging parts 45a, 45a can be easily fitted and pushed down into the locking members 44, 44.

In addition, because the connecting member 45 is provided by bending both ends of a wire to form the engaging parts 45a, 45a, the connecting member 45 can be easily formed.

Because the connecting member 45 is bent at both ends thereof to have an arc shape and has a circular cross section, which prevents both the bodies 43, 43 and the connecting member 45 itself from being damaged due to contact between edge of connecting member and the bodies when the connecting member 45 is fixed to both the bodies 43, 43, so that a durability of the filler member 40 is increased. Making the cross section with respect to an axis of the connecting member 45 circular can reduce stress concentration caused by an external force acting on the connecting member 45 from the locking member 44.

The first embodiment has been described as above. However the present invention is not limited to the embodiment and can be modified without departure of the sprit of the present invention.

In the filler member 40 shown in FIG. 4, the fitting member 41 is formed with a plastic material, and the connecting member 45 is formed with a steel wire. However, the martial is not limited to this, but the fitting member 41 may be formed with a metal material, and the connecting member 45 is formed with a plastic material.

Figure 6:
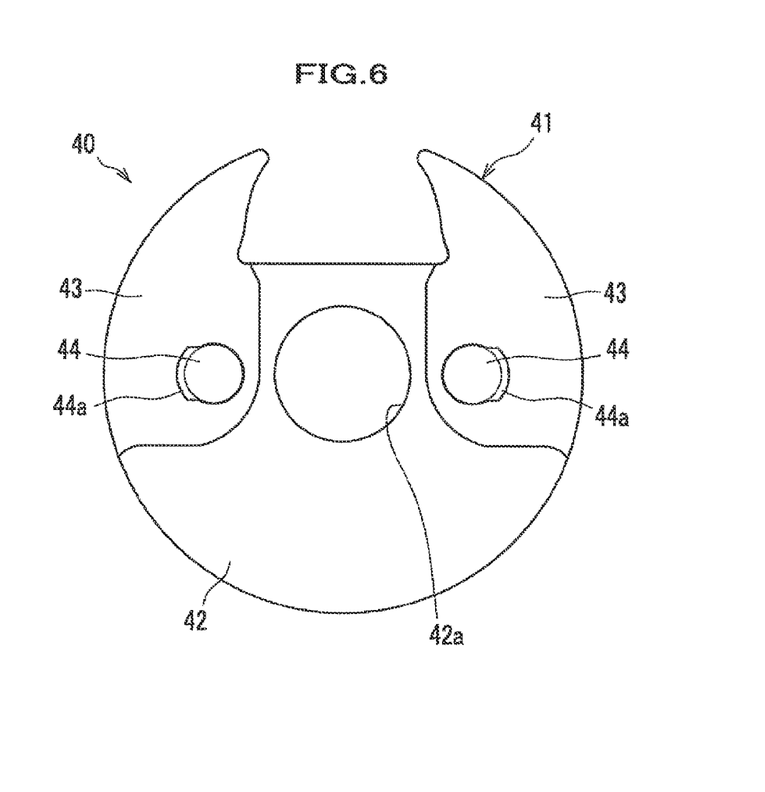
FIG. 6 is a side view of a fitting member according to a second embodiment of the present invention, wherein a flat plate is extended.

FIG. 6 is a side view of a fitting member according to a second embodiment of the present invention, wherein a flat plate is extended.

A shape of the fitting member 41 is not limited to the above-described shape, but may be extended downwardly as shown in FIG. 6 so that the flat plate 42 can overlap with the weight member 32 (see FIG. 4) entirely. This increases a stability of the filler member 40.

In addition, at an edge of the flat plate 42 a wall may be stood so as to contact an outer circumferential face of the weight member 32. Both bodies 43, 43 may be connected continuously outside the arm 31. Accordingly, the stability of the filler member 40 can be increased.

A shape of the body 43 is not limited to the shape shown in FIG. 3, but may be hollowed by forming channels and holes to reduce the weight. In addition, the crank web 30 and both the bodies 43, 43 may be formed not to have a disk shape, but it is sufficient to dispose the bodies 43, 43 on both sides of the arm 31 in the rotation direction of the arm 31.

In the first embodiment as shown in FIG. 4, the connecting member 45 is formed with a steel wire having S-shaped, but the shape is not limited to this.

Figure 7A:
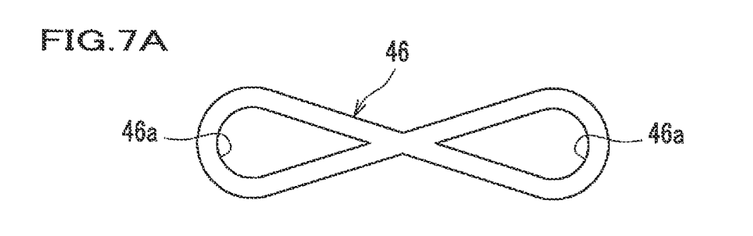
FIG. 7A is a plan view of a connecting member having an 8-shape according to a third embodiment.

FIG. 7A is a plan view of a connecting member having an 8-shape according to a third embodiment.

As shown in a connection member 46 in FIG. 7A, a steel wire may be formed in an 8-shape, and ring parts 46a, 46a formed at both ends may be fitted into an outer circumference of the locking member 44 (see FIG. 5).

Figure 7B:
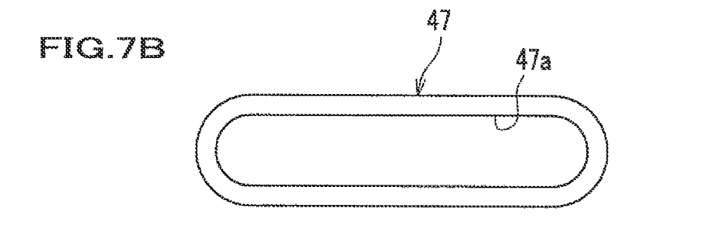
FIG. 7B is a plan view of a connecting member having an oblong circular shape according to a fourth embodiment.

FIG. 7B is a plan view of a connecting member having an oblong circular shape according to a fourth embodiment.

In addition as shown by a connecting member 47 in FIG. 7B, a steel wire may be formed in an oblong shape, both the locking member 44, 44 (see FIG. 5) may be hooked on inner circumferential part 47a.

Figure 7C:
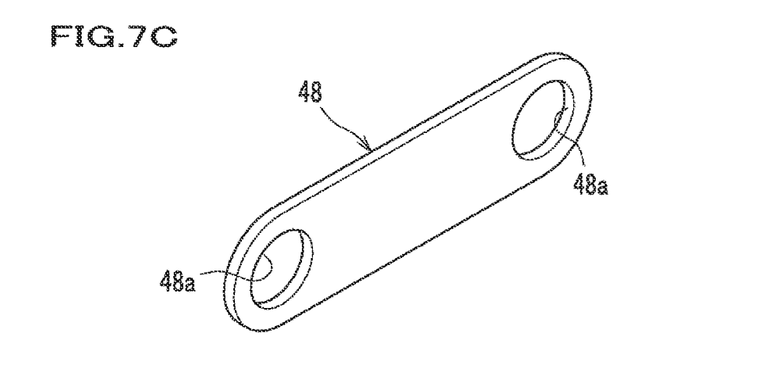
FIG. 7C is a perspective view of a connecting member of a flat plate according to a fifth embodiment.

FIG. 7C is a perspective view of a connecting member of a flat plate according to a fifth embodiment.

A connecting member 48 is made as shown in FIG. 7C to have through holes 48a, 48a formed at both end in a longitudinal direction of a flat plate, and both the through holes 48a, 48a may be fitted to outer circumferences of the locking members 44.

The connecting member may be divided in left-right direction into left and right parts which are engaged with the locking member 44, respectively. After that, the left and right parts may be connected. For example, an oblong connecting member is divided in the left-right direction, two U-shape connecting members are slide in left and right direction to outer circumferences of the locking member 44, and the connecting member may be connected on the inner face 30b of the weight member 32. In addition, configuration of the two connecting members is not limited to this, but connection may be made by fitting a protrusion formed on one connecting member into a channel formed in the other connecting member.

As described above, in the configuration of the connecting members are divided, the divided connecting members have simple shapes, so that accuracy in processing can be increased.

Figure 7D:
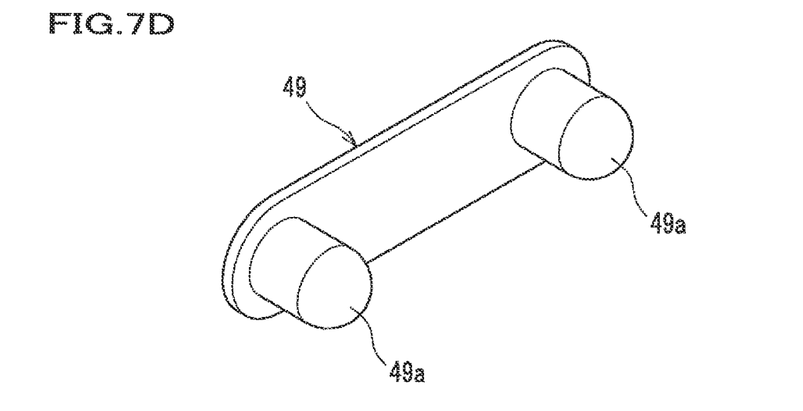
FIG. 7D is a perspective view of a connecting member having protrusions according to a sixth embodiment.

FIG. 7D is a perspective view of a connecting member having protrusions according to a sixth embodiment.

A connecting member 49 shown in FIG. 7D can be formed to have protrusions 49a, 49a at both ends in a longitudinal direction of a flat plate, and the protrusions are inserted into through holes formed in the bodies.

In the first embodiment, as shown in FIG. 1, the connecting member 45 is formed so as to stride the rotation center of the crank journal 20. However, the position is not limited to this. In addition, a plurality of connecting members may be mounted on both the bodies 43, 43.

The invention claimed is:

1. A filler member to be installed in a crankshaft including a crank web including:
    an arm member, extending in a diametrical direction of a crank journal, including a connecting rod connecting part to be connected to a connection rod;
    a weight member, disposed opposite to the connecting rod connecting part across a rotating center of the crank journal, extending on both sides of the arm member in a radial direction of the crank journal, the filler member comprising:
    a fitting member including a through hole and two bodies formed on both sides of the through hole; and
    a connecting member mounted on the bodies, wherein
    the crank journal inserted into the through hole and the fitting member is fixed to one side face of the crank web to dispose the bodies on both sides of the arm member in a rotational direction of the arm member, wherein
    the connecting member is mounted on the bodies to stride the arm member on another side face of the crank web, wherein
    the crank web is sandwiched between the fitting member and the connecting member, wherein
    the bodies include locking members protruding therefrom, wherein
    a line connecting center positions of engaging parts passes across a rotation center of the crank journal; and wherein
    the connecting member includes the engaging parts engaged with outer circumferences of the locking members.

2. The filler member as claimed in claim 1, wherein the connecting member is disposed to stride a rotation center of the crank journal.

3. The filler member as claimed in claim 1, wherein the connecting member comprises a wire, and the engaging parts formed by bending both ends of the wire.

4. The filler member as claimed in claim 1, wherein the locking member comprises a diameter-expanded member, at a tip of the locking member, having a diameter greater than a diameter of a base of the locking member, and the engaging part of the connecting member is engaged with an outer circumference of the base of the locking member.

* * * * *